United States Patent [19]

Hönlinger et al.

[11] Patent Number: 5,415,063
[45] Date of Patent: May 16, 1995

[54] ROTATABLE MACHINE COMPONENT WITH DEVICE FOR REDUCING ACOUSTIC VIBRATIONS

[75] Inventors: Herwig Hönlinger, Gross-Rohrheim; Jürgen Eichhorn, Weinheim, both of Germany

[73] Assignee: Firma Carl Freudenberg, Weinheim/Bergstrasse, Germany

[21] Appl. No.: 220,585

[22] Filed: Mar. 30, 1994

Related U.S. Application Data

[63] Continuation of Ser. No. 911,557, Jul. 1, 1992, abandoned.

[30] Foreign Application Priority Data

Oct. 8, 1991 [DE] Germany ............... 41 33 286.5

[51] Int. Cl.6 ............................................. F16H 55/14
[52] U.S. Cl. ............................ 74/574; 74/443; 188/379; 181/207; 295/7
[58] Field of Search ................ 74/443, 446, 574; 188/378, 379, 218 R, 218 L; 464/180; 181/207, 209; 295/7

[56] References Cited

U.S. PATENT DOCUMENTS

| 1,136,839 | 4/1915 | Seidel | 74/443 |
|---|---|---|---|
| 1,852,538 | 4/1932 | Peterson | 74/443 |
| 3,057,220 | 10/1962 | Parr | 74/443 |
| 3,080,771 | 3/1963 | Baldwin | 74/443 |
| 3,990,324 | 11/1976 | Fishbaugh et al. | 74/574 |
| 4,043,431 | 8/1977 | Ellege | 188/218 X L |
| 4,254,985 | 3/1981 | Kirschner | 74/574 |
| 4,317,388 | 3/1982 | Wojcikowski | 74/574 |
| 4,635,501 | 1/1987 | Mizuno et al. | 74/574 |
| 4,817,455 | 4/1989 | Buxe | 74/574 |
| 4,970,909 | 11/1990 | Pelzer | 74/574 |
| 5,058,267 | 10/1991 | Andrä et al. | 74/574 |
| 5,139,120 | 8/1992 | Gomi | 74/574 |
| 5,140,868 | 8/1992 | Mizuno et al. | 74/574 |

FOREIGN PATENT DOCUMENTS

| 891951 | 7/1949 | Germany | 74/443 |
|---|---|---|---|
| 2057625 | 4/1981 | United Kingdom . | |
| 2138097 | 10/1984 | United Kingdom | 74/443 |

Primary Examiner—George F. Lesmes
Assistant Examiner—Terrel Morris
Attorney, Agent, or Firm—Karl F. Milde, Jr.

[57] ABSTRACT

A rotatable machine component with a ring of resilient material secured to it in the vicinity of at least one axially projecting collar. The collar has a continuous annular groove around it that cuts into its contour radially, and the ring is secured in the groove just by snapping into it. The ring and the rotatable component rest loosely against each other, when the component is not rotating, without internal tension in the ring.

7 Claims, 2 Drawing Sheets

ROTATABLE MACHINE COMPONENT WITH DEVICE FOR REDUCING ACOUSTIC VIBRATIONS

This application is a continuation of application Ser. No. 911,557, filed Jul. 1, 1992, now abandoned.

BACKGROUND OF THE INVENTION

The present invention concerns a rotatable machine component with a ring of resilient material secured to it in the vicinity of at least one axially projecting collar.

A rotatable component of this type is known from the German patent application No. 3,023,977. It is a transmission gear wheel with a least two deformable rings of elastomer that absorb acoustically annoying vibrations. The rings are accommodated in recesses in the wheel and radially compressed between the facing cylindrical surfaces of a retaining ring, also accommodated in a recess, and the main section of the wheel. The acoustically annoying vibrations, however, are not really satisfactorily suppressed due to the compression of the ring into the recess in the wheel.

SUMMARY OF THE INVENTION

The principal object of the invention is to provide improved rotatable, machine component that will better isolate acoustically annoying vibrations and that is simple to manufacture and assemble.

This object, as well as other objects that will become apparent from the discussion that follows, are achieved, in accordance with the present invention, by providing a continuous annular groove around the collar of the rotatable component that cuts into its contour radially, and the ring is secured in the groove just by snapping into it. This improvement makes the rotatable component particularly easy to manufacture and assemble and avoids acoustically annoying vibrations in operation.

That a ring secured in a groove, just by snapping into it and without internal tension, will isolate acoustically annoying vibrations significantly more effectively than a ring that is forced in or cemented in is a surprising and unexpected phenomenon.

The ring can have a ridge around it that projects radially beyond the groove, with the cross-section of the ridge outside the groove at least to some extent matching the contour of the rotatable component. A ring that is accordingly not completely surrounded and subjected to tension by supports or by the rotatable component can also substantially contribute to an advantageous result. The ring is secured particularly flexibly to the rotatable component and can effectively suppress high-frequency vibrations in the acoustically annoying range. Another advantage is that the ring rests at least to some extent flat against the rotatable component. The ring in another advantageous embodiment extensively parallels the collar axially outside the groove.

The ring and the rotatable component can rest against each other, when the component is not rotating without internal tension in the ring. This characteristic especially simplifies assembling the ring and the rotatable component and makes the device particularly effective and long-lasting in that the ring of elastic material will not be subject to relaxation fatigue.

There can be a gap in at least part of the area between the ring and the rotatable component. This gap can be radially no wider than 0.5 mm and is preferably 0.1 to 0.3 mm wide. Such a structure particularly facilitates adaptation to specific applications.

The groove in another and particularly simple embodiment of the invention can consist of a radial conical surface in the inner surface of the collar with a diameter that is shorter in the vicinity of the collar's mouth. The shorter diameter will prevent loss. The extent and slope of the ring can be axially essentially identical with those of the collar's conical surface, a design that maintains the ring securely inside the rotatable component. The ring can, in particular, be a section of rubber hose, at least some of which is in contact with an axial curb that demarcates the conical surface when the rotatable component is in operation.

The groove in another advantageous embodiment is on the outer surface of the collar and is radially demarcated by a conical surface with a diameter that is longer in the vicinity of the collar's mouth. Positioning the ring on the outer surface of the rotatable component allows particularly cost-effective and simple processing of the collar's inner circumference. Conical surfaces or other structures to prevent the ring from separating from the rotatable component are unnecessary in this version. Only a single conical surface in the vicinity of the outer circumference of the rotatable component keeps both components together reliably. A conical surface in the form of an undercut can be formed in the rotating component.

A projection on the ring can rest against the face of the collar. Depending on the shape of the rotatable component and ring in accordance with the invention, this version can be of particular advantage when the component is to be employed in a space that is limited, especially axially. It will be particularly easy to mount the ring in position later.

The rotatable component can for example be a belt pulley. Acoustically annoying vibrations are particularly common in conjunction with belt pulleys and with rotatable components in the form of gears (cogwheels) employed in transmissions.

The preferred embodiments of the present invention will now be described with reference to the accompanying drawings, which illustrate the separate components somewhat schematically.

DESCRIPTION OF THE PREFERRED EMBODIMENTS

The ring of elastic material according to the invention can be made of rubber, plastic, or felt and is accommodated in the rotating component (wheel or pulley).

Figure 1:
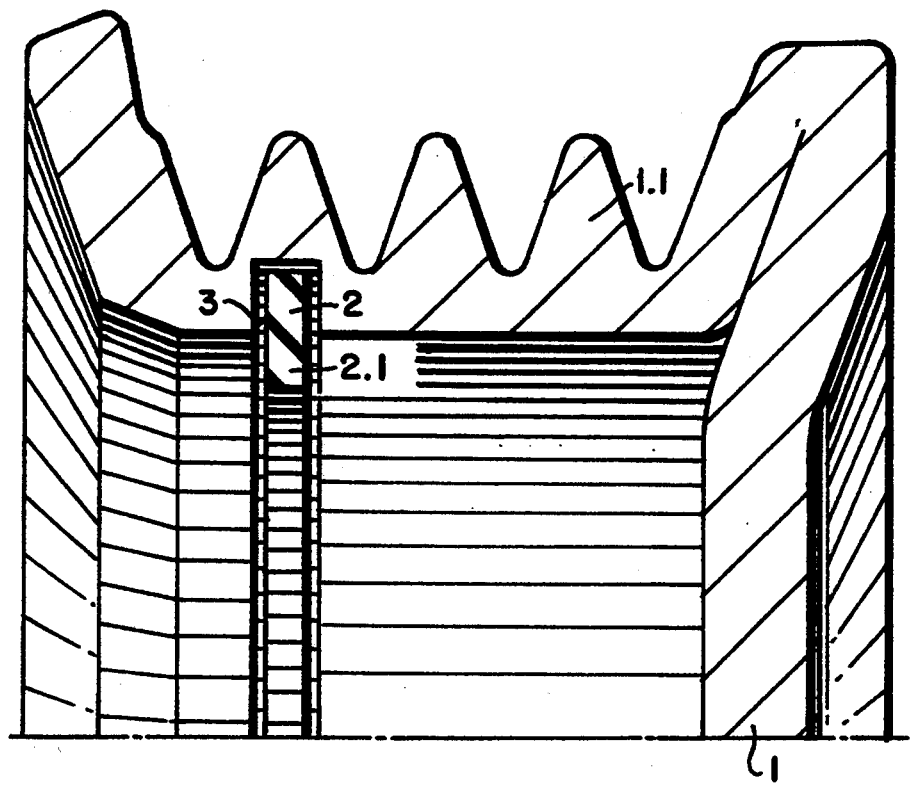
FIG. 1 is a cross-sectional view through a portion of a rotatable component, in the form of a belt pulley, in accordance with a first preferred embodiment of the present invention.

The ring 2 illustrated in FIG. 1 is accommodated in a groove 3. The ring snaps into the groove without inner tension and will not come out of it.

Figure 2:
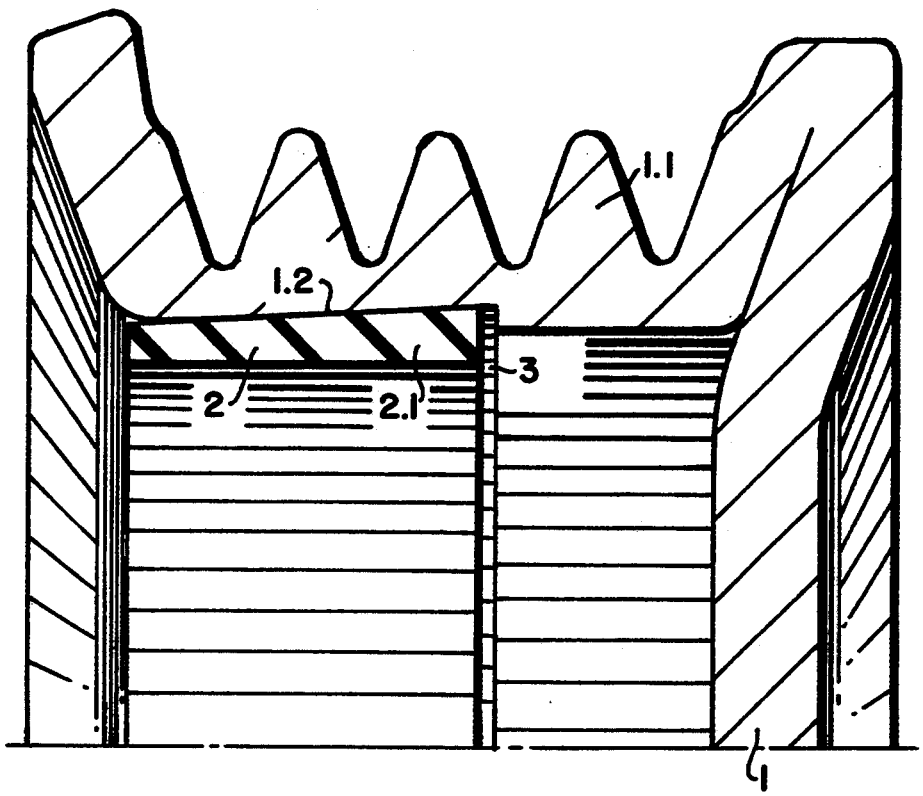
FIG. 2 is a cross-sectional view through a portion of a rotatable component, in the form of a belt pulley, in accordance with a second preferred embodiment of the present invention.

The groove 3 illustrated in FIG. 2 is in the vicinity of the inner circumference of a collar 1.1 and is constituted by a conical surface 1.2, ensuring that the also conical ring 2, which is essentially axially as long as, and at the same angle as, the conical surface 1.2, will be reliably secured.

Figure 3:
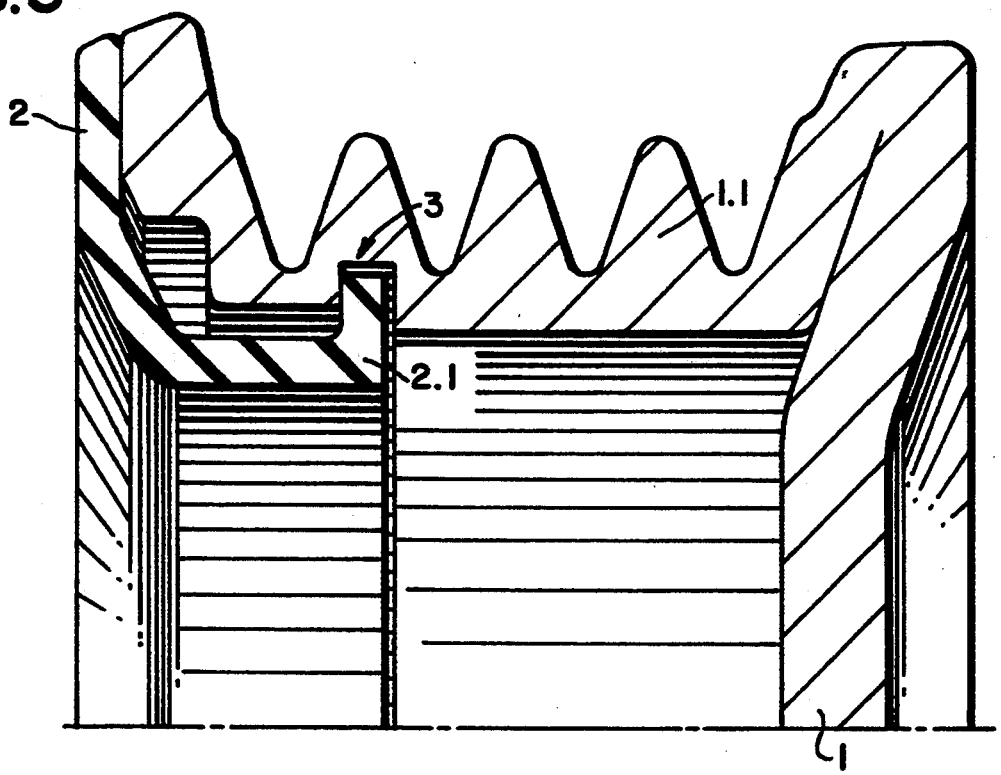
FIG. 3 is a cross-sectional view through a portion of a rotatable component, in the form of a belt pulley, in accordance with a third preferred embodiment of the present invention.

The ring 2 illustrated in FIG. 3 is very slightly tensioned axially in conjunction with the rotatable component 1. This embodiment facilitates assembly, particularly in space that is of limited access axially, without sacrificing the overall advantages of the invention.

Figure 4:
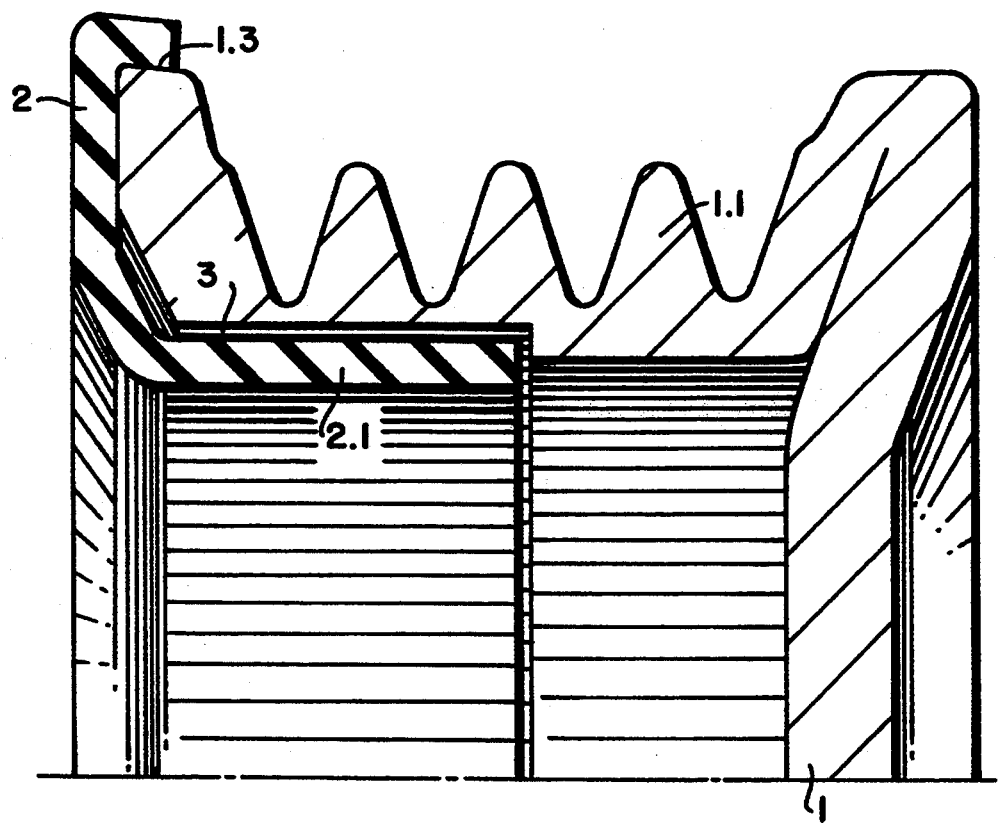
FIG. 4 is a cross-sectional view through a portion of a rotatable component, in the form of a belt pulley, in accordance with a fourth preferred embodiment of the present invention.

The embodiment illustrated in FIG. 4 has a ring 2 that snaps over an undercut in the form of a conical surface 1.3 in the outer circumference in the vicinity of the mouth of the collar 1.1.

Rotatable components 1, which are in this case belt pulleys, will outstandingly isolate acoustically annoying vibrations and are easy to install and long-lasting.

There has thus been shown and described a novel rotatable machine component that fulfills all the objects and advantages sought therefor. Many changes, modifications, variations, and other uses and applications of the subject invention will, however, become apparent to those skilled in the art after considering this specification and the accompanying drawings, which disclose the preferred embodiments thereof. All such changes, modifications, variations, and other uses and applications that do not depart from the spirit and scope of the invention are deemed to be covered by the invention, which is to be limited only by the claims that follow.

What is claimed is:

1. In a rotatable machine component with a ring of elastomeric, resilient material secured to it on at least one axially projecting collar, the improvement wherein the collar has a continuous annular groove around it that cuts into its contour radially, and wherein the ring and the rotatable component rest against each other with a radial gap between the ring and the component and with the ring secured in the groove without internal tension when the component is not rotating.

2. The rotatable component defined in claim 1, wherein the ring has a ridge around it that projects radially beyond the groove, and wherein the cross-section of the ridge outside the groove substantially matches the contour of the rotatable component.

3. The rotatable component defined in claim 1, wherein the gap is radially no wider than 0.5 mm.

4. The rotatable component defined in claim 1, wherein the groove consists of a radial conical surface in the inner surface of the collar with a diameter that increases with distance from the collar's mouth.

5. The rotatable component defined in claim 1, wherein the groove consists of a radial conical surface on the outer surface of the collar with a diameter that decrceases with distance from the collar's mouth.

6. The rotatable component defined in claim 2, wherein the ridge rests against the face of the collar.

7. A method of using the rotatable component defined in claim 1, wherein the component is a belt pulley, said method comprising the steps of installing the component on a rotatable shaft and passing an endless drive belt around said component.

* * * * *